United States Patent [19]

Shapiro

[11] 4,425,868
[45] Jan. 17, 1984

[54] COATING HOOD
[75] Inventor: Richard G. Shapiro, Elmira, N.Y.
[73] Assignee: Thatcher Glass Corporation, Greenwich, Conn.
[21] Appl. No.: 335,086
[22] Filed: Dec. 28, 1981
[51] Int. Cl.³ .............................................. B05B 15/02
[52] U.S. Cl. .................................... 118/314; 118/316; 118/324; 118/326; 118/DIG. 7; 427/424
[58] Field of Search ................ 427/424; 118/314, 315, 118/316, 324, 326, DIG. 7

[56]  References Cited
U.S. PATENT DOCUMENTS

| | | | |
|---|---|---|---|
| 3,438,803 | 4/1969 | Dubble et al. ...................... | 118/314 |
| 3,561,940 | 2/1971 | Scholes et al. ........................... | 65/60 |
| 3,708,351 | 1/1973 | Dallas et al. . | |
| 3,724,641 | 4/1973 | Wainwright et al. ................ | 198/40 |
| 3,785,851 | 1/1974 | Novice . | |
| 3,842,793 | 10/1974 | Novice et al. . | |
| 3,873,264 | 3/1975 | Daugherty et al. .................. | 432/18 |
| 3,926,103 | 12/1975 | Smith .............................. | 118/326 X |
| 3,952,118 | 4/1976 | Novice . | |
| 4,002,143 | 1/1977 | Dover ............................. | 118/314 X |

FOREIGN PATENT DOCUMENTS 2028177  3/1980  United Kingdom ............... 118/316

Primary Examiner—Shrive P. Beck
Attorney, Agent, or Firm—Jones & Askew

[57] ABSTRACT

A coating hood for applying coating fluid to vitreous articles such as bottles or the like. Coating fluid is applied through a plurality of coating manifolds within the hood, and these manifolds on opposite sides of the hood are offset with respect to each other so as to avoid creating a zone of fluid stagnation within the hood.

1 Claim, 2 Drawing Figures

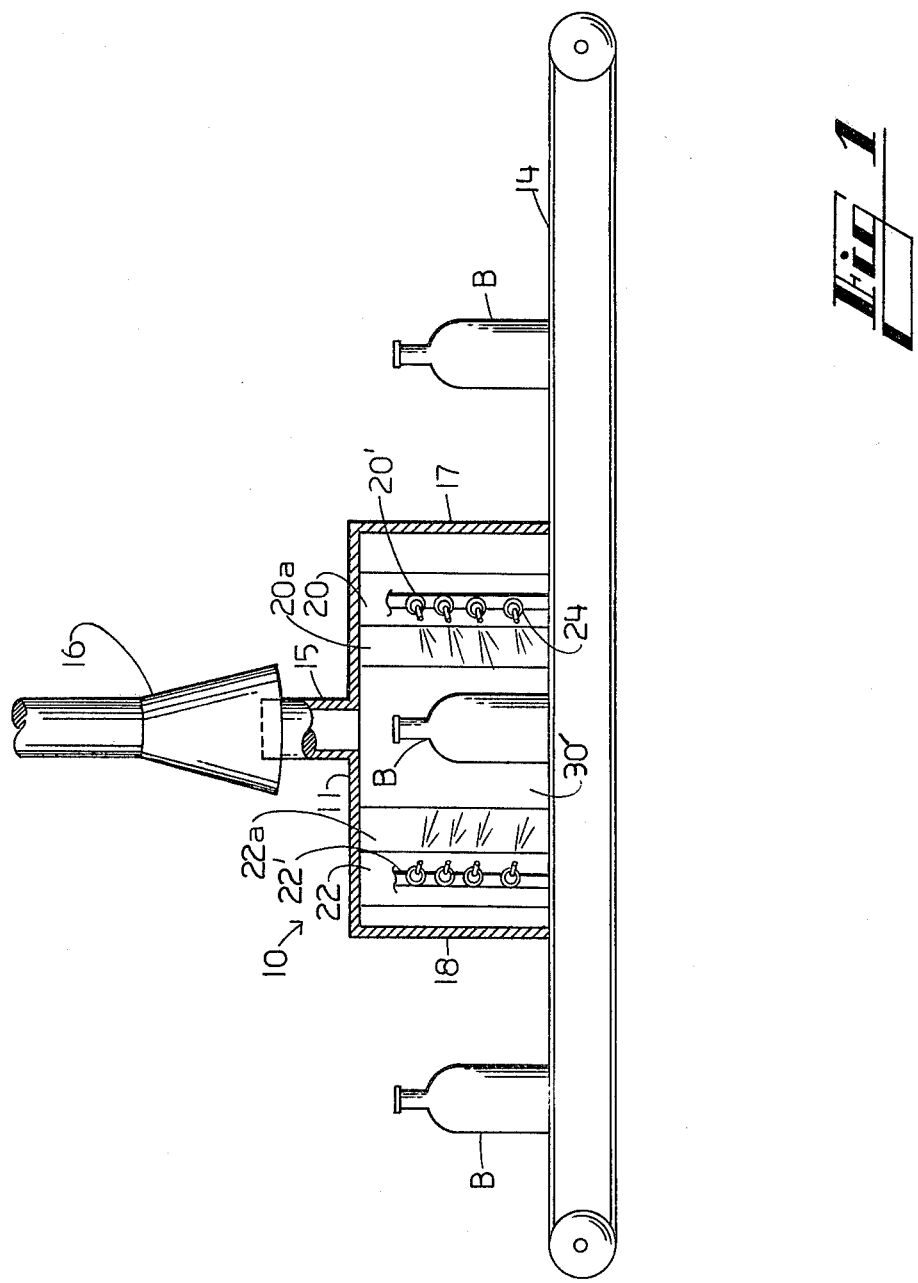

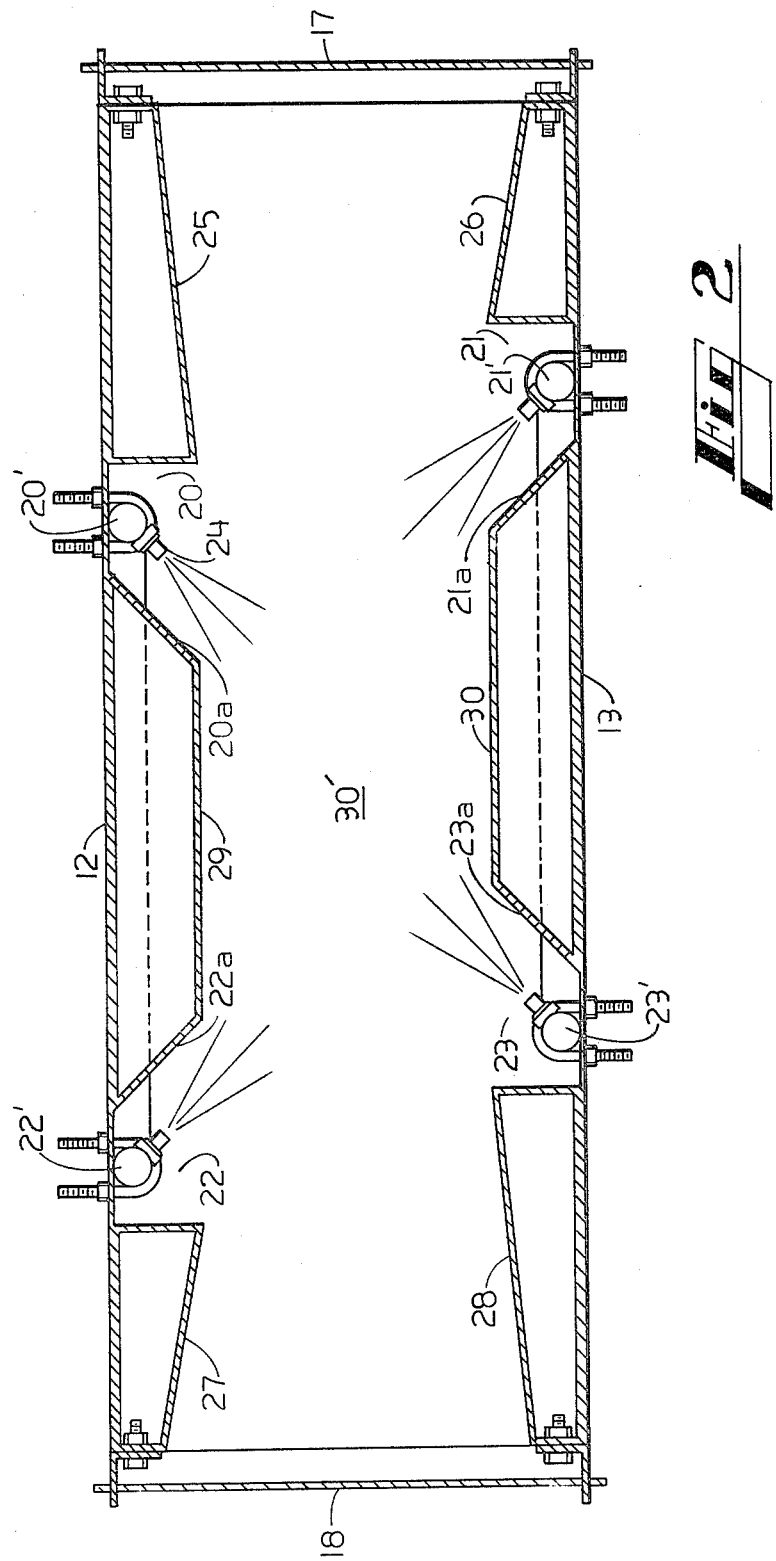

COATING HOOD

FIELD OF INVENTION

This invention relates in general to coating hoods, and relates in particular to a coating hood used for applying coatings to vitreous articles such as glass bottles or the like.

BACKGROUND OF INVENTION

It is known in the art to apply coatings for various purposes to vitreous articles such as glass bottles or the like. These coating materials in many cases are applied to the newly-formed bottle soon after the bottle is removed from the forming machine. The coating material reacts with the surface of the glass, providing increased strength, durability, and resistance to scratches and abrasions due to handling and the like. The nature and composition of such coating materials are well-known to those skilled in the art.

The foregoing coating process typically takes place as the bottles are moving along a conveyor from a bottle forming machine, as the coating process typically takes place as the bottles are conveyed through a coating hood. Within the coating hood the bottles are subjected to the appropriate coating fluid, which may be in gaseous form, from nozzles or other applicators. The hood is vented to remove excess coating fluid and possible reaction products. The coated bottles exit the hood on the conveyor belt, and move to the next production stage such as an annealing lehr.

Although various coating hoods for vitreous articles are known to the prior art, one such hood includes one or more pairs of fluid dispensing manifolds within the hood. The manifolds making up each pair are positioned across from each other on opposite sides of the conveyor so as to apply coating fluid to both sides of the articles passing between the manifolds, and the manifolds are equipped with nozzles to direct a flow of coating fluid toward the bottles or other vitreous articles passing through the hood on the conveyor.

It has been learned that a zone or region of stagnant flow of the coating fluid from the manifold nozzles occurs with such prior art coating hoods. This stagnation zone occurs along the path of bottle travel within the hood, and bottles passing through the stagnation zone tend to be coated with less than desirable uniformity.

SUMMARY OF INVENTION

According to the present invention, the stagnant flow problem of the prior art has been eliminated or greatly reduced by applying coating fluid through opposing manifolds that are longitudinally offset relative to each other within the coating hood. The coating fluid directed from each pair of manifolds flanking the conveyor within the hood thus impinges the bottles at locations offset from each other, along the travel path of the bottles. This offset of the coating fluid manifolds, making up each flanking pair of manifolds, is believed to greatly reduce if not eliminate the aforementioned fluid stagnation problem, and substantially improves the uniformity of coating.

Stated somewhat more specifically, the coating hood according to the present invention includes one or more pairs of coating manifolds preferably set into separate niches within the side walls of the coating hood. Each manifold and its respective niche on one side of the hood are longitudinally offset from the manifold and niche on the opposite side of the hood. Each manifold includes one or more nozzles directing a spray of coating fluid at an oblique angle relative to the bottle conveyor, and a wall of each manifold-receiving niche may be angled to accommodate the oblique direction of flow.

Stated even more specifically, a coating hood according to the present invention has at least two pairs of coating manifolds flanking the bottle conveyor and longitudinally spaced apart within the hood. The coating manifolds making up each such pair are offset from each other, and each manifold includes one or more nozzles directing a spray of coating fluid towards a central coating region within the hood.

Accordingly, it is an object of the present invention to provide an improved coating hood for vitreous articles or the like.

It is another object of the present invention to provide a coating hood giving a more uniform coating on vitreous articles such as bottles or the like.

It is still another object of the present invention to provide a glassware coating hood which applies coating fluid to articles while minimizing or eliminating zones of fluid stagnation within the hood, thereby providing a more uniform coating.

The foregoing and other objects and advantages will become more readily apparent from the following description of a preferred embodiment.

BRIEF DESCRIPTION OF DRAWING

FIG. 1 is a schematic elevation view, partially broken away and sectioned for illustrative purposes, of a coating hood according to a preferred embodiment of the present invention.

FIG. 2 is a detailed top plan sectioned view of the hood shown in FIG. 1, with the conveyor deleted for illustrative purposes.

DESCRIPTION OF PREFERRED EMBODIMENT

A glass coating hood according to the present invention is shown generally at 10 in FIG. 1. The coating hood 10 includes a top wall 11, a pair of side walls 12 and 13 (FIG. 2), and two end walls 17 and 18. The hood 10 is positioned above and astride a conventional conveyor belt 14 upon which travel a succession of vitreous articles such as the exemplary bottles B. The end walls 17 and 18 of the hood contain apertures or openings suitable for the continuous passage of the bottles B through the coating hood 10, so that these bottles serially pass through the interior coating region 30' of the hood. A vent stack 15 and associated vent hood 16 are connected to the top wall 11 of the hood. Those skilled in the art will appreciate that the conveyor 14 may carry the bottles or like articles from a forming machine (not shown) and through the coating region 30' of the hood 10 to an annealing lehr (not shown) for further processing.

The interior of the hood 10, as best shown in FIG. 2, includes a separate pair of deflector members which extend inwardly into the hood from each end thereof. Thus, the interior of the hood just inside the end wall 17 includes deflector members 25 and 26 on opposite sides of the hood, aligned on converging planes into the hood. Similarly, deflector members 27 and 28 converge inwardly from the other end 18 of the hood. These pairs of deflector members function to contact bottles which may be laterally displaced from the center of conveyor 14 (not shown in FIG. 2), so as to centralize the bottles for their continuing passage through the coating region 30' within the hood. The pairs of deflectors 25, 26 and 27, 28 converge to a nominal width within the hood, as defined between the interior side walls 29 and 30 flanking the coating region 30'.

The coating hood 10 is equipped with a first pair of coating fluid dispensing manifolds 20', 21', and with a second pair of such manifolds 22', 23'. The separate manifolds making up each pair of manifolds are mounted on opposite sides of the hood 10; thus, manifold 20' is mounted on the interior of side wall 12 and manifold 21' is mounted on the interior of side wall 13. Similarly, the manifold 22' of the second pair of manifolds is mounted adjacent the interior of side wall 12, while the manifold 23' is likewise mounted adjacent side wall 13. Each manifold is equipped with a plurality of nozzles 24 for directing a stream of coating fluid from the manifolds toward the coating region 30'. Those skilled in the art will realize that the number and angular alignment of nozzles on each manifold is determined by certain variable factors such as the distances to the centerline and the outer periphery of the bottle being coated, and the nature of the coating fluid.

An important aspect of the present invention is the longitudinal offset of each manifold on one side of the hood, with respect to the opposite manifold on the other side of the hood. Thus, the manifold 20' is not directly opposite the manifolds 21' on the other side of the hood, but instead lies in a vertical plane displaced to the left (as viewed in FIG. 2) of the vertical plane occupied by the manifold 21'. Likewise, the manifold 22' is displaced to the left of the manifold 23' on the opposite side of the hood. Although the manifolds making up each pair of manifolds, namely, manifold pairs 20', 21' and 22', 23', are located on opposite sides of the hood and direct fluid streams outwardly into the coating region 30', these manifolds and their respective fluid streams are longitudinally offset a distance relative to the direction of travel of bottles through the hood. This longitudinal offset of the fluid coating manifolds on opposite sides of the hood eliminates or substantially reduces the zone or zones of fluid stagnation within the coating region 30' and thus provides a significant improvement in the uniformity of coating applied to bottles passing therethrough.

Each manifold preferably is located within a niche formed in the interior side walls made up by the deflector members and the interior side walls. Thus, the manifold 20' is located in the niche 20 between the deflector member 25 and the interior side wall 29. The manifolds 21', 22' and 23' are likewise located within niches 21, 22 and 23 formed within the interior side walls of the hood 10. These niches maintain the respective manifolds and associated nozzles 24 laterally spaced behind the nominal travel path of bottles through the hood 10, so that the bottles normally cannot come into contact with the manifolds and nozzles.

Each manifold with its associated nozzles, as seen in FIG. 2, is aligned to direct a stream of coating fluid toward the coating region 30' at a nonperpendicular angle to the longitudinal axis of the hood 10. Assuming bottles enter the hood through an opening in the end 18, the entry-end manifold 22' and 23' are seen to direct coating fluid in a downstream direction toward the coating region 30', that is, at an acute angle to the path of bottle travel. The other two manifolds 20' and 21', which may be termed the exit-end manifolds, likewise direct their fluid sprays in an upstream direction toward the coating region 30', that is, at an obtuse angle relative to the path of bottle travel. In order to facilitate this nonperpendicular flow of coating fluid from the respective manifolds, one side wall of each manifold-receiving niche is angled inwardly toward the coating region 30', approximately paralleling the nominal direction of coating fluid sprayed from the respective manifold. Because each of the four disclosed manifolds directs fluid on an angular path inwardly toward the coating region 30, the corresponding inward walls 20a, 21a, 22a and 23a of the niches 20-23 are angled inwardly in a similar manner, so as to accommodate and not impede the flow of coating fluid from the respective manifolds and nozzles.

It will thus be seen that the present coating hood provides an effective apparatus for applying coating fluid to vitreous articles such as bottles and the like, while avoiding or greatly reducing the likelihood of fluid stagnation zones associated with coating hoods of the prior art.

It should be understood that the foregoing relates only to a preferred embodiment of the present invention, and that numerous changes and modifications may be made therein without departing from the spirit and scope of the invention as defined in the following claims.

I claim:

1. Hood apparatus for coating vitreous articles, comprising:

hood means comprising a top wall and a pair of side walls extending downwardly from said top wall to define a coating chamber;

means operative to convey vitreous articles along a predetermined path through said coating chamber;

a first pair of coating fluid spray means operative to direct a coating fluid toward said predetermined path;

one of said spray means being adjacent one side wall at a certain location along said conveying path;

the other said spray means being adjacent the other side wall and longitudinally offset from said first spray means relative to said predetermined path, so that fluid from said pair of spray means impinges vitreous articles on said conveying means in longitudinally offset pattern so as to avoid fluid flow stagnation;

a second pair of coating fluid spray means operative to direct coating fluid toward said predetermined path;

one of the spray means of said second pair being at said one side wall and the other spray means of said second pair being at the other side wall longitudinally offset from said one spray means of said second pair;

each said spray means comprising a fluid manifold disposed in a niche formed in the adjacent sidewall;

at least one spray aperture associated with the manifold to direct a coating fluid spray at a certain nonperpendicular angle toward said predetermined path; and each said niche including a nonperpendicular wall portion permitting unimpeded fluid flow from the manifold associated with that niche.

* * * * *